April 7, 1931.  S. M. WAGEN  1,800,123
VEHICLE
Filed May 13, 1930
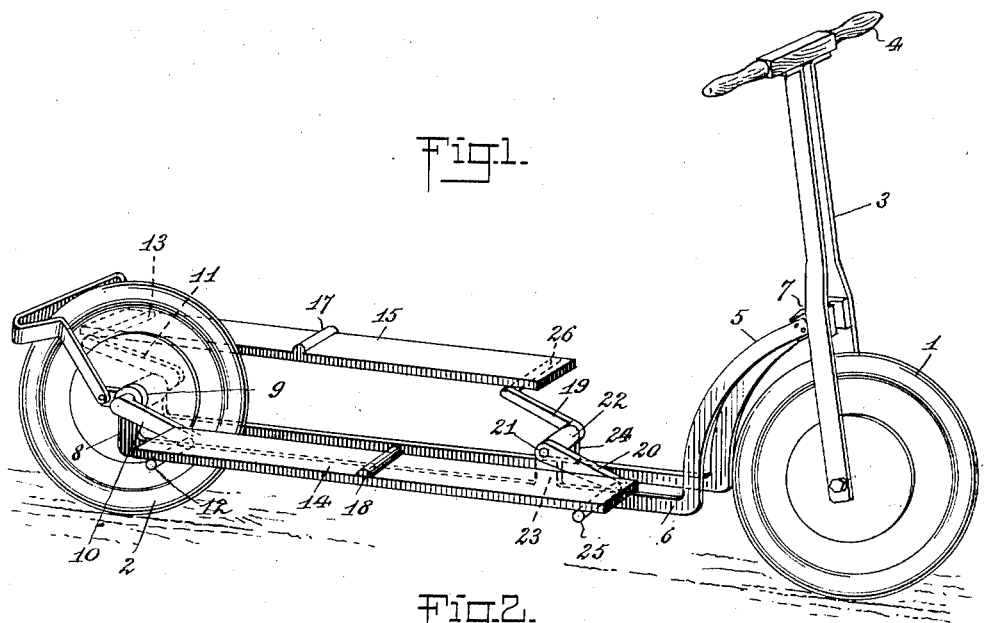
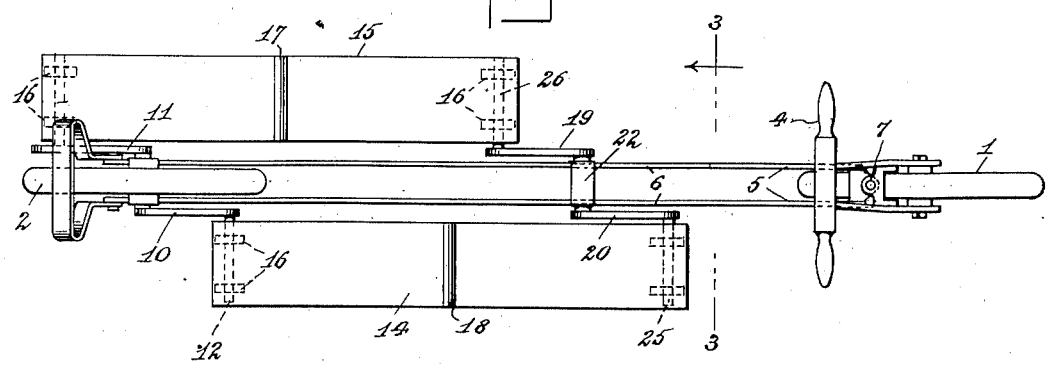
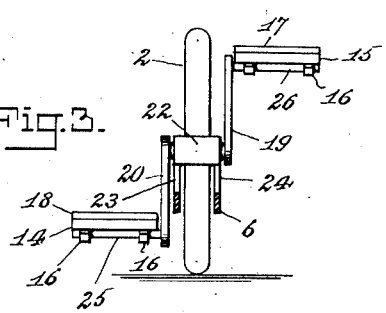
WITNESSES
INVENTOR
Samuel Morris Wagen
BY
ATTORNEYS Patented Apr. 7, 1931

1,800,123

UNITED STATES PATENT OFFICE

SAMUEL MORRIS WAGEN, OF NEW YORK, N. Y.

VEHICLE

Application filed May 13, 1930. Serial No. 451,996.

This invention relates to an improved vehicle of the type commonly known as a "scooter", and has for its object to provide a construction where the parts may be set for propelling the device or for merely supporting the weight of a person as the device coasts.

Another object of the invention is to provide a vehicle of the scooter type wherein a pair of movable platforms are presented and so connected with the rear wheel as to present propelling and supporting platforms for a person using the device.

A further object of the invention is to provide a vehicle of the scooter type wherein the rear wheel is provided with a coaster brake and a pair of cranks, the same being associated with moving platforms having crank supports at the front whereby by proper shifting of the weight of a person the scooter may be propelled or may hold the platforms stationary and permit the scooter to coast.

In the accompanying drawings—

Figure 1 is a perspective view of a vehicle disclosing an embodiment of the invention;

Figure 2 is a top plan view of the vehicle shown in Figure 1;

Figure 3 is a sectional view through Figure 2, on the line 2—2.

Referring to the accompanying drawings by numerals 1 and 2 represent the front and rear wheels respectively, wheel 1 having a front fork 3 connected therewith and carrying handle bars 4. The front end 5 and frame 6 are pivotally connected by suitable mechanism 7 with fork 3 so that this fork may be used for steering. The handle bar may be of any suitable or well known type.

The frame 6 is made from two bars, as shown in the drawings, the said bars being preferably parallel and provided with upwardly extending portions 8 mounted on the axle of the coaster brake shown conventionally at 9 forming part of wheel 2. Coaster brake 9 may be of any desired or usual type and has cranks 10 and 11 secured thereto in any convenient way, said cranks having pins 12 and 13 extending beneath the respective platform sections 14 and 15. Suitable straps or other fastening means 16 secure the pins 12 and 13 to the respective platform sections.

The platform sections 14 and 15 are preferably approximately as wide as a person's foot and are provided with abutments or stops 17 and 18 so that the foot of the operator will not slip. At the front a pair of cranks 19 and 20 are provided, said cranks being connected by a suitable axle or shaft 21 mounted in a bearing box 22. The bearing box 22 is carried by the upstanding lugs 23 and 24 of frame 6. Pins 25 and 26 extend beneath the sections 14 and 15 and are secured thereto in a similar way to pins 12 and 13.

When the device is in use a child or other person stands on the platform sections 14 and 15 and by shifting the weight causes the cranks 10 and 11 to rotate so that the rear wheel 2 will be propelled. Rear wheel 2 is provided with a coaster brake conventionally shown at 9 and thus the operator may stop the propelling action at any time by merely placing the same weight on each platform section. The device will then coast in the usual way of coasters. Also, in case it should be desired to propel the device by pushing one foot on the ground, this may be readily done as the coaster brake 9 merely coasts under these circumstances.

When it is desired to stop or slow down the movement of the vehicle, the platform sections 14 and 15 may be moved in a reverse direction so as to cause the brake mechanism of the coaster brake 9 to function.

It will be evident that the treadles or platform sections 14 and 15 may be stopped at any time without stopping the movement of the vehicle and may again be started at any time, so that when the device begins to slow down more speed may be secured if desired.

I claim—

1. A vehicle of the character described, comprising a frame, front and rear wheels for supporting said frame, said rear wheel being provided with a coaster brake, a pair of cranks connected with the coaster brake, a platform section connected with each of said cranks, and a crank mechanism for supporting the front part of said platform sections, whereby upon shifting the weight of the person standing on the platform sections the rear wheel may be propelled or may be retarded by a braking action.

2. A vehicle of the character described comprising a frame, front and rear wheels for supporting said frame, crank means connected with the rear wheel, a pair of platform sections connected with the crank means and causing the crank means to function, and an abutment arranged substantially central of these platform sections for preventing the foot of the operator from slipping.

3. A vehicle of the character described, comprising a frame, front and rear wheels for supporting said frame, a double crank structure carried by said frame near the front, a pair of platform sections connected to the crank and means for connecting the rear part of said platforms to said rear wheel so that upon the movement of the platforms said rear wheel will be urged forward or retarded.

SAMUEL M. WAGEN.